(12) United States Patent
Kim et al.

(10) Patent No.: US 10,609,716 B2
(45) Date of Patent: Mar. 31, 2020

(54) METHOD AND APPARATUS FOR PROVIDING FEEDBACK BETWEEN BASE TRANSCEIVER STATIONS THROUGH COOPERATIVE COMMUNICATION IN WIRELESS COMMUNICATION SYSTEM

(71) Applicant: Samsung Electronics Co., Ltd., Suwon-si, Gyeonggi-do (KR)

(72) Inventors: Sunghoon Kim, Suwon-si (KR); Sangsoo Jeong, Suwon-si (KR); Sung Hwan Won, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/207,905

(22) Filed: Dec. 3, 2018

(65) Prior Publication Data

US 2019/0104528 A1    Apr. 4, 2019

Related U.S. Application Data

(63) Continuation of application No. 14/810,940, filed on Jul. 28, 2015, now Pat. No. 10,149,307.

(Continued)

(51) Int. Cl.

| *H04W 72/08* | (2009.01) |
| *H04B 7/06* | (2006.01) |
| *H04B 7/024* | (2017.01) |
| *H04W 24/10* | (2009.01) |
| *H04W 28/08* | (2009.01) |
| *H04W 72/04* | (2009.01) |

(52) U.S. Cl.
CPC .......... *H04W 72/085* (2013.01); *H04B 7/024* (2013.01); *H04B 7/0626* (2013.01); *H04W 24/10* (2013.01); *H04W 28/08* (2013.01); *H04W 72/0426* (2013.01)

(58) Field of Classification Search
CPC ..... H04L 5/0035; H04L 5/0091; H04L 43/06; H04W 28/02; H04W 24/10; H04W 24/08; H04J 11/0023; H04J 11/0053; H04B 7/0626; H04B 7/0632; H04B 7/063; H04B 7/0417; H04B 7/0456
See application file for complete search history.

(56) References Cited

U.S. PATENT DOCUMENTS

| 8,391,206 B2 | 3/2013 | Alexiou et al. |
| 8,412,256 B2 | 4/2013 | Lee et al. |

(Continued)

FOREIGN PATENT DOCUMENTS

WO    2014-072814 A2    5/2014

*Primary Examiner* — Jung Liu
(74) *Attorney, Agent, or Firm* — Jefferson IP Law, LLP

(57) ABSTRACT

A method and an apparatus for feedback based on information transmitted between base stations (or base stations) through cooperative communication are provided. The method includes receiving, from the second base station, a first message for requesting a channel state information (CSI) report, and transmitting, to the second base station, a second message including the CSI report, based on the first message. The present disclosure relates to a pre-5th-generation (5G) or 5G communication system to be provided for supporting higher data rates beyond 4th-generation (4G) communication system such as long term evolution (LTE).

22 Claims, 15 Drawing Sheets

Related U.S. Application Data

(60) Provisional application No. 62/032,264, filed on Aug. 1, 2014.

(56) References Cited

U.S. PATENT DOCUMENTS

| | | |
|---|---|---|
| 8,831,619 B2 | 9/2014 | Wang et al. |
| 8,929,235 B2 | 1/2015 | Baldemair et al. |
| 2010/0034151 A1 | 2/2010 | Alexiou et al. |
| 2010/0267408 A1 | 10/2010 | Lee et al. |
| 2012/0092989 A1 | 4/2012 | Baldemair et al. |
| 2012/0093010 A1* | 4/2012 | Vajapeyam ........... H04L 1/0026 370/252 |
| 2012/0177018 A1* | 7/2012 | Abraham ............. H04L 1/0027 370/338 |
| 2013/0023301 A1 | 1/2013 | Wang et al. |
| 2013/0244709 A1* | 9/2013 | Davydov .......... H04W 72/0413 455/501 |
| 2014/0293914 A1* | 10/2014 | Maattanen ........ H04W 72/1278 370/329 |
| 2014/0295815 A1 | 10/2014 | Cho et al. |
| 2014/0321328 A1* | 10/2014 | Zuniga ................... H04W 8/06 370/254 |
| 2014/0370908 A1* | 12/2014 | Lee ...................... H04L 5/0032 455/452.1 |
| 2015/0078303 A1* | 3/2015 | Jongren ................ H04L 1/0026 370/329 |
| 2015/0189644 A1* | 7/2015 | Lorca Hernando .... H04B 7/024 370/329 |
| 2015/0207601 A1* | 7/2015 | Kim ...................... H04L 5/0048 370/329 |
| 2015/0208269 A1* | 7/2015 | Damnjanovic ....... H04L 1/0026 370/252 |
| 2015/0222400 A1* | 8/2015 | Xiong .................. H04L 1/0026 370/329 |
| 2015/0229377 A1* | 8/2015 | Kuchi .................. H04B 7/0626 370/252 |
| 2015/0230113 A1* | 8/2015 | Zhang ..................... H04L 43/06 370/252 |
| 2015/0295686 A1 | 10/2015 | Deng et al. |
| 2015/0327114 A1* | 11/2015 | Gupta ................. H04W 40/248 370/235 |
| 2015/0350954 A1* | 12/2015 | Faccin .................. H04W 76/16 370/254 |
| 2015/0382393 A1* | 12/2015 | Kiss ..................... H04W 76/16 370/328 |
| 2016/0036571 A1* | 2/2016 | Park ....................... H04B 7/024 370/330 |
| 2016/0197687 A1* | 7/2016 | Song ........................ H04L 5/00 370/329 |
| 2017/0026824 A1* | 1/2017 | Kim ....................... H04W 8/08 |
| 2017/0041905 A1* | 2/2017 | Chen ................ H04W 72/0446 |
| 2017/0134986 A1* | 5/2017 | Jeong .................. H04W 28/10 |
| 2019/0014529 A1* | 1/2019 | Karampatsis ......... H04W 40/36 |

\* cited by examiner

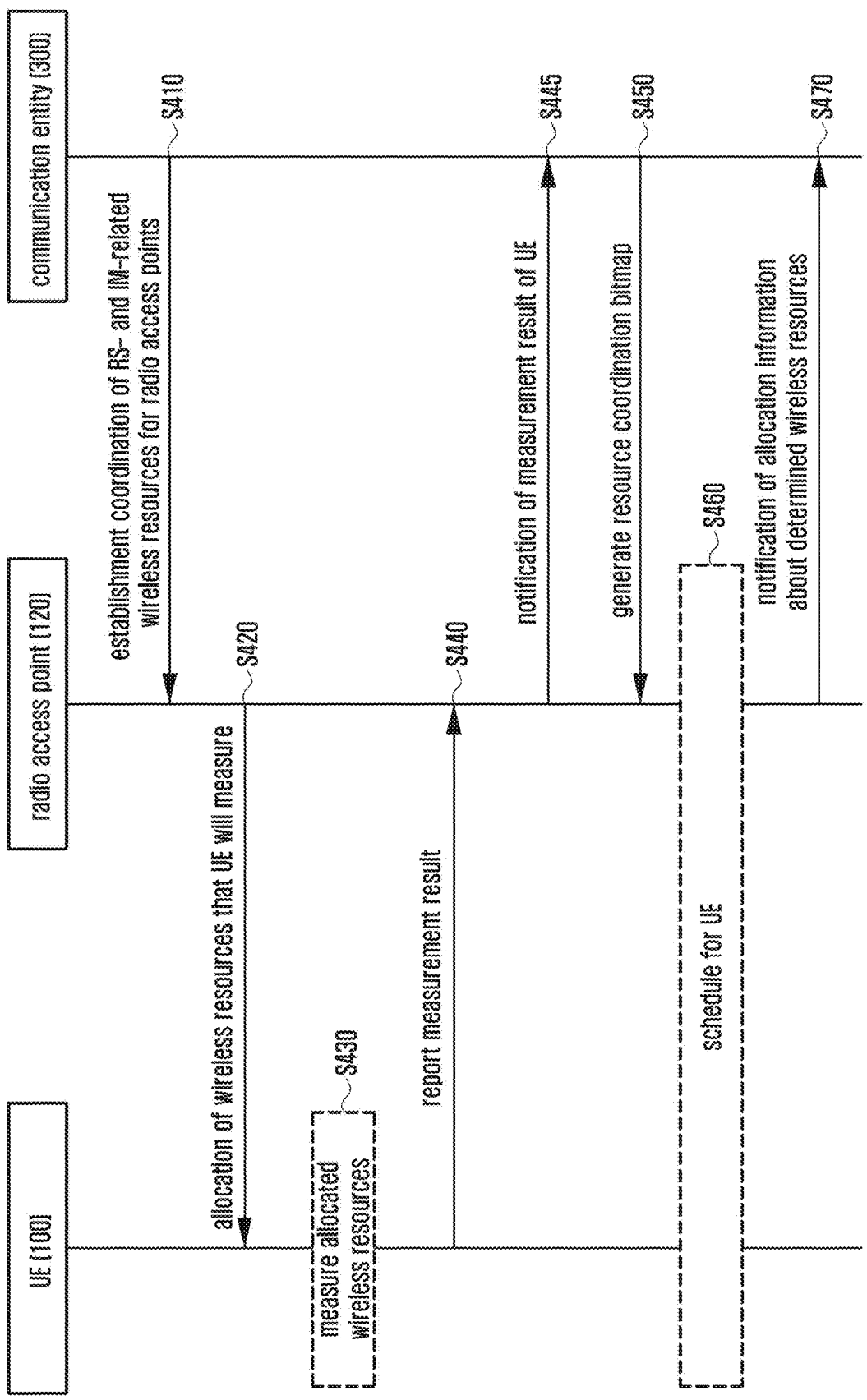

METHOD AND APPARATUS FOR PROVIDING FEEDBACK BETWEEN BASE TRANSCEIVER STATIONS THROUGH COOPERATIVE COMMUNICATION IN WIRELESS COMMUNICATION SYSTEM

CROSS-REFERENCE TO RELATED APPLICATION(S)

This application is a continuation application of prior application Ser. No. 14/810,940, filed on Jul. 28, 2015, and was based on and claimed priority under 35 U.S.C. § 119(e) of a U.S. provisional patent application filed on Aug. 1, 2014 in the U.S. Patent and Trademark Office and assigned Ser. No. 62/032,264, the entire disclosures of which are hereby incorporated by reference.

TECHNICAL FIELD

The present disclosure relates to wireless communication systems. More particularly, the present disclosure relates to a method and an apparatus for providing feedback based on information transmitted between base transceiver stations through cooperative communication.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Therefore, a need exists for a method and an apparatus for providing feedback based on information transmitted between base transceiver stations through cooperative communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for a first base station (eNB) to request channel state information (CSI) from a second base station (eNB) in order to make inter-eNB cooperative communication (cooperative communication between base stations).

Another aspect of the present disclosure is to provide a method and an apparatus for transmitting, by using enhanced-relative narrowband transmission power (RNTP), information indicating whether a second base station performs the allocation of resources to comply with resource allocation information that a first base station has generated, based on channel state information (CSI), and transmitted to the second base station, when the second base station performs allocation of resources is provided.

In accordance with an embodiment of the present disclosure, a method for feeding back to a second base station by a first base station in a communication system is provided. The method includes receiving, from the second base station, a first message for requesting a CSI report, and transmitting, to the second base station, a second message including the CSI report, based on the first message.

In accordance with another embodiment of the present disclosure, a method for supporting feeding back of a first base station by a second base station in a communication system is provided. The method includes transmitting, to the first base station, a first message for requesting a CSI report, and receiving, from the first base station, a second message including the CSI report based on the first message.

In accordance with another embodiment of the present disclosure, the present disclosure provides a first base station that provides feedback to a second base station in a wireless communication system comprising a transceiver configured to perform transmission/reception of signals, and a controller configured to receive, from the second base station, a first message for requesting a CSI report, and transmit, to the second base station, a second message including the CSI report, based on the first message.

In accordance with another embodiment of the present disclosure, the present disclosure provides a second base station that supports feedback of a first base station in a wireless communication system comprising a transceiver configured to perform transmission/reception of signals, and a controller configured to transmit, to the first base station, a first message for requesting a CSI report, and receive, from the first base station, a second message including the CSI report based on the first message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which:

FIGS. 4A and 4B are flow diagrams that describe a method of making coordination between radio access points according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
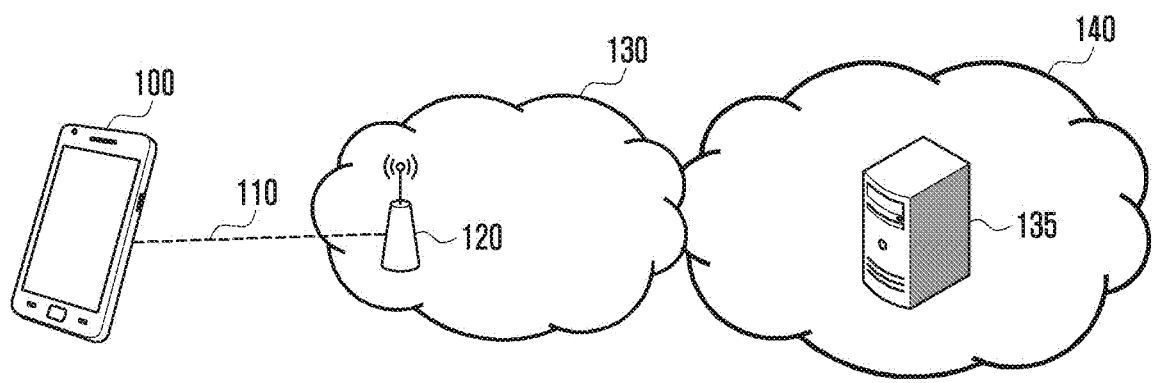
FIG. 1 is a diagram illustrating a general wireless communication system according to an embodiment of the present disclosure.

FIG. 1 is a diagram illustrating a general wireless communication system according to an embodiment of the present disclosure.

Referring to FIG. 1, the wireless communication system may include a user equipment (UE) 100, a radio access network (RAN) 130, and a core network 140.

The RAN 130 may be divided into several entities one of which is an entity 120 for interacting with a UE 100 through a wireless interface 110, and the others of which are entities connected to each other via wires in the wireless communication system. Examples of the entity 120 for interacting with the UE 100 through a wireless interface 110 are an evolved node B (eNB), a node B (NB) or a radio network subsystem (RNS) including a NB, a base station or a base station subsystem (BSS) including a base station, a wireless access point, a Home eNB, a Home NB, a home eNB gateway (GW), an X2 GW, and the like. In this description, for the sake of convenience, the term, radio access point, is called the RAN 130 or at least one of the examples of the entity 120, listed above.

Except for some exceptions, the radio access point 120 generally includes one or more cells each of which controls a specific range of coverage within which the UE 100 receives corresponding services. The cell refers to a cell of a general cellular system. The radio access point 120 refers to a device that manages and controls the cells. In this description, for the sake of convenience, the radio access point 120 may be used in the sense of 'cell.' In addition, when describing an object, in various embodiments of the present disclosure, for the sake of convenience, the terms 'cell' and 'radio access point 120' may be used together.

The core network 140 may include a RAN control entity 135. The RAN control entity 135 is in charge of general control functions, such as mobility management, authentication, security, and the like. Examples of the RAN control entity 135 are a mobility management entity (MIME), a Serving general packet radio service (GPRS) support node (SGSN) where GPRS is short for packet radio service, and the like.

The radio access point 120 provides services to the UE 100 through a wireless interface 110. To this end, each radio access point 120 has a proper range of coverage for providing services.

Figure 2:
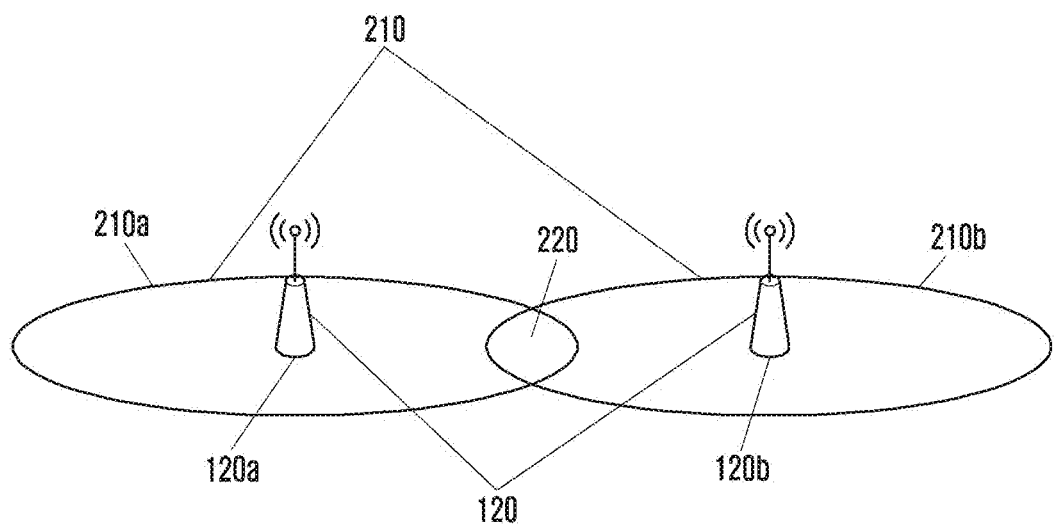
FIG. 2 is a diagram illustrating a case where radio access points have one or more overlapping coverage area according to an embodiment of the present disclosure.

FIG. 2 is a diagram illustrating a case where radio access points have one or more overlapping coverage area according to an embodiment of the present disclosure.

Referring to FIG. 2, two general radio access points 120a and 120b adjacent to each other have coverage areas 210a and 210b (210), respectively. In this case, there may be an overlapping coverage area 220 generated as the two coverage areas 210a and 210b are overlapped. When the UE 100 receives services in the overlapping coverage area 220, the UE 100 may be susceptible to interference. For example, when the UE 100 receives a service from a radio access point 120*a* in the overlapping coverage area 220, the UE 100 may be susceptible to interference by the radio access point 120*b*.

Although the embodiments shown in FIG. 2 are implemented in such a way that the radio access points 120*a* and 120*b* have the coverage areas 210*a* and 210*b* similar in area, it should be understood that the present disclosure is not limited by the size of coverage area. In addition, it will be appreciated that there may be various types of overlapping coverage areas where interference occurs, e.g., a case where the coverage area 210*a* of the radio access point 120*a* is located within the coverage area 210*b* of the radio access point 120*b*, a case where two or more overlapping coverage area 220 are generated as the coverage areas of two or more radio access points 120 are overlapped, and the like.

In addition to occurrence of interference, the overlapping coverage area 220 may also cause frequent signaling. An example of the signaling is a handover-related signaling.

In order to address these issues, the 3rd Generation Partnership Project (3GPP) has recently developed a technology for a number of radio access points 120 to make cooperative communication with each other. Examples of the cooperative communication technology are coordinated multi-point transmission and reception (CoMP), carrier aggregation, and the like.

Figure 3:
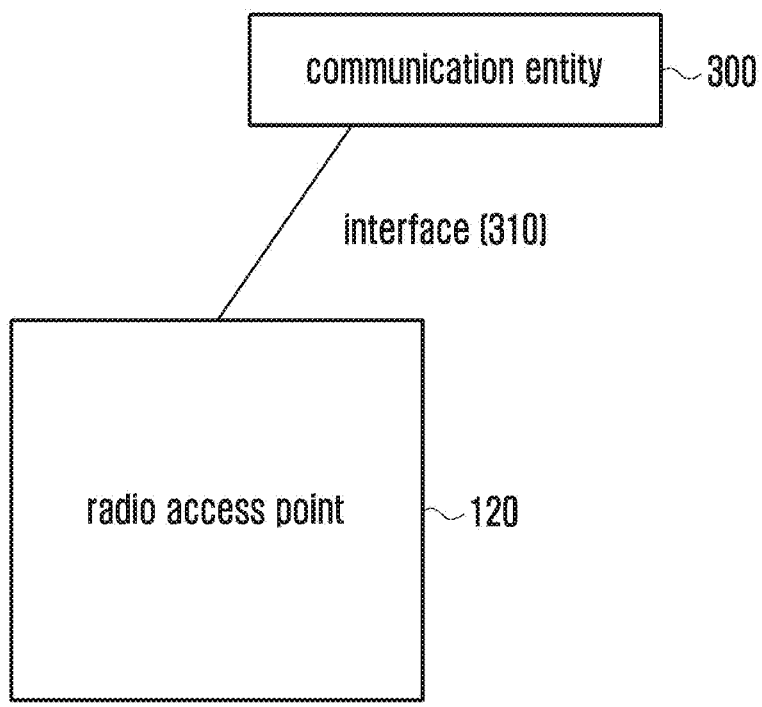
FIG. 3 is a diagram illustrating a configuration of transmission and reception of coordinated information between radio access points according to an embodiment of the present disclosure.

FIG. 3 is a diagram illustrating a configuration of transmission and reception of coordinated information between radio access points according to an embodiment of the present disclosure.

Referring to FIG. 3, in order to manage a problem that may be caused by the overlapping coverage area 220, described above referring to FIG. 2, one or more radio access points 120 need(s) to exchange, with each other, information related to the UE 100 to which the radio access points 120 are providing services. Since there are, in general, a number of radio access points in the vicinity of one radio access point 120, it may be advantageous that the radio access point 120 exchanges, with as many radio access points as possible, information about the UE 100 that they are providing services. FIG. 3 illustrates a configuration designed to be proper so that the radio access point 120 exchanges, with a relatively large number of radio access points, information about the UE 100 that they are providing services.

Referring to FIG. 3, a communication entity 300 is connected to one or more radio access points 120 through a proper interface 310, and may perform at least one of the following processes:

receiving, from one or more radio access points 120, information about at least one of the radio access points 120 and the UE 100 served by the at least one of the radio access points 120, and transmitting, to one or more radio access points 120, information about at least one of the radio access points 120 and the UE 100 served by the at least one of the radio access points 120.

The communication entity 300 may be an existing entity or a new entity. Examples of the existing entity are an MME, an SGSN, a radio network controller (RNC), an evolved serving mobile location center (E-SMLC), a radio access point (including an eNB, a Node B, and the like), operations, administration, and maintenance (OAM), and the like.

The proper interface 310 may vary according to types of the communication entity 300. For example, when the communication entity 300 is a radio access point, the interface 310 may be an X2 interface (i.e., X2-C or X2-U). When the communication entity 300 is a new type of entity, the interface 310 may be a new type of interface defined to comply with the new communication entity.

In addition, when the communication entity 300 is a radio access point, the communication entity 300 may need network configurations in order to distinguish the process from those of the other radio access points. For example, when the communication entity 300 is a radio access point, the communication entity 300 may require an environment where network configurations have been well established.

Figure 4A:
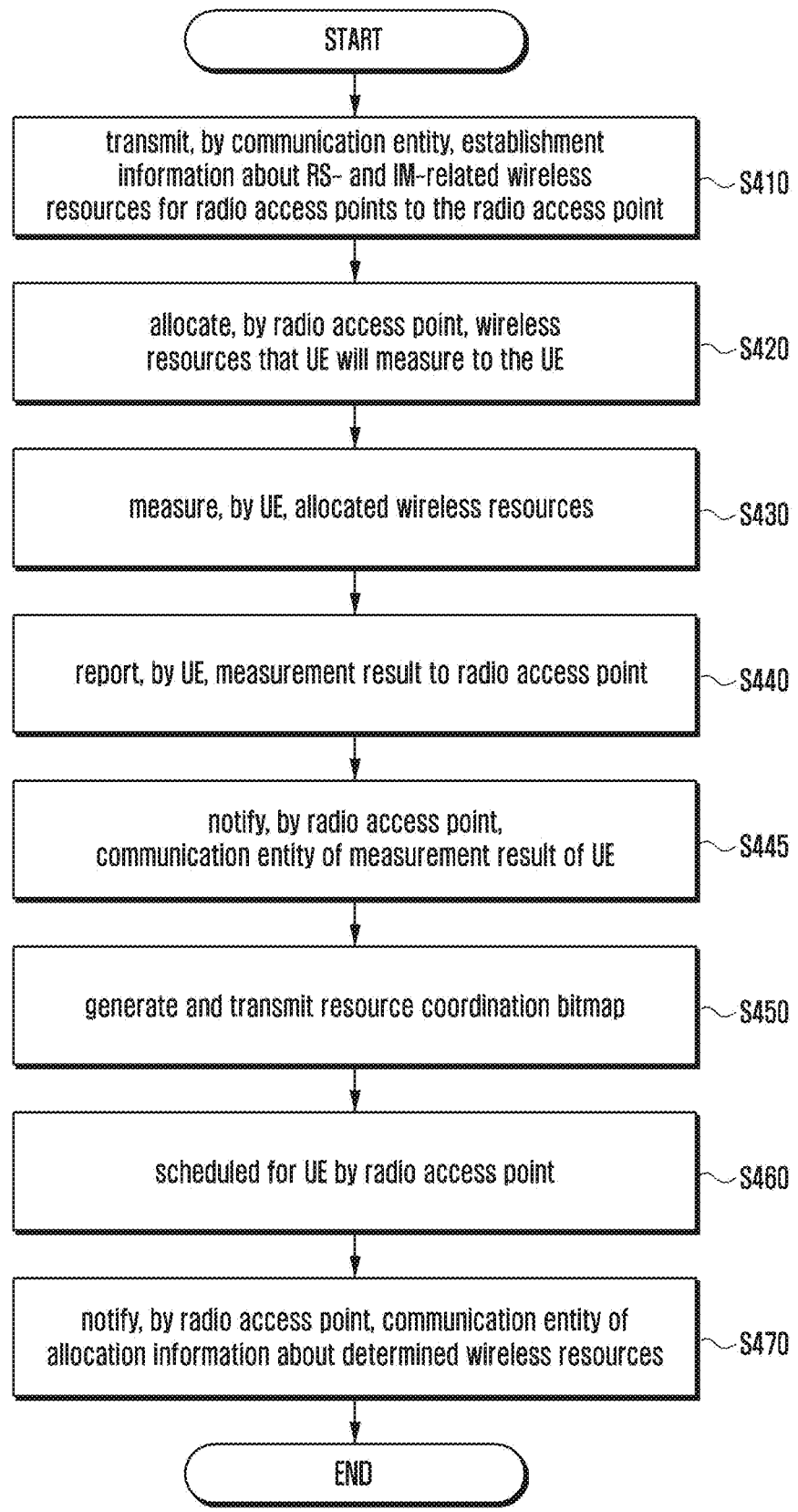

FIGS. 4A and 4B are flow diagrams that describe a method of making coordination between radio access points according to an embodiment of the present disclosure. FIGS. 4A and 4B will use the same reference numbers for the same operations.

Referring to FIGS. 4A and 4B, without considering making coordination between radio access points, the radio access point 120 may perform allocation of wireless resources, based on a state of the UE 100 to which the radio access point 120 is providing services. On the contrary, when radio access points are coordinated with each other, the radio access point 120 may perform allocation of wireless resources, based on states of the UE 100 to which other radio access points are providing services as well as a state of the UE 100 to which the radio access point 120 is providing services, in order to improve the entire performance of a number of radio access points.

The state of the UE 100 may be represented by a combination of a number of factors. Typically, the state of the UE may include at least one of the following a channel state of the UE 100, an interference condition, an amount of uplink (UL) data that have already been transmitted, an amount of UL data in a buffer to be transmitted, an amount of downlink (DL) data that have already been received, and an amount of DL data in a buffer to be received. The channel state of the UE 100 may be obtained from the measurement result of radio service (RS). The interference condition may be obtained from the measurement result of the interference measurement (IM) resource.

In order to improve the entire performance of a number of radio access points 120, the radio access points 120 may show various patterns of coordination in a specific time and a specific frequency band. An example of coordination pattern may be a state where, for a corresponding time and frequency band, some of the BASE STATIONs do not allocate wireless resources and another part allocate wireless resources. In order to determine a coordination aspect, knowledge (e.g., information) is needed about the interference condition and the channel state of the UE 100 which are predicted for various patterns of coordination.

The coordination between radio access points 120 may include the following four processes:

properly setting RS- and IM-related wireless resources so that the UE 100 can measure various channel states and interference conditions, transmitting, by UE the 100, information about channel state and/or interference condition by using properly set RS- and IM-related wireless resources (or, further, editing information transmitted from the UE 100 and/or transmitting the information to communication entity 300), forming an interference coordination pattern based on information about interference condition and channel state and of UE, and transmitting an interference coordination pattern to the radio access point 120 and scheduling the UE 100 based on the interference coordination pattern.

Referring to FIGS. 4A and 4B, the method of making coordination between radio access points is described as follows.

The communication entity 300 may transmit establishment information about RS- and IM-related wireless resources for radio access points to the radio access point 120 in operation S410. For various situations, in order to detect the interference condition and the channel state of the UE 100, eNBs may need to be coordinated with each other, to transmit RS, and to allocate IM resources. When the eNB 120 transmits RS and allocates IM resources without considering the conditions of the surrounding eNBs and the UE 100 receives the RS- and IM-related information and makes a measurement through corresponding resources, it is difficult to detect the interference condition and the channel state of the UE 100 in a corresponding condition (or coordination pattern).

The radio access point 120 allocates wireless resources that the UE 100 will measure in operation S420. The allocation of wireless resources that the UE 100 will measure may be performed by one or more of the following: a radio resource control (RRC) connection reconfiguration message, RRCConnectionReconfiguration, an RRC connection re-establishment message, RRCConnectionReestablishment, and an RRC connection setup message, RRCConnectionSetup. More specifically, the allocation of wireless resources may be performed as the radio access point 120 transmits the physical configuration dedicated information element (IE) (physicalConfigDedicated IE) for the message to the UE 100.

The UE 100 properly re-configures physical channel configuration based on physicalConfigDedicated IE in operation S430. Thereafter, the UE 100 measures the interference condition and the channel state according to the physical channel configuration.

The UE 100 may provide the measurement report to the radio access point 120, based on the measured channel state and interference condition in operation S440. The measurement report may be reported to the radio access point 120 through physical uplink control channel (PUCCH) or physical uplink shared channel (PUSCH). In addition, when the radio access point 120 receives the information from the UE 100, the radio access point 120 may transmit the received information with or without processing the received information to the communication entity 300 in operation S445.

The information that the radio access point 120 transmits to the communication entity 300 may include at least one of the following:
  measurement result by the UE 100 from resources configured in CSI-RS-Config,
  measurement result by the UE 100 from resources configured in CSI-RS-ConfigZP,
  measurement result by the UE 100 from resources configured in DMRS-Config,
  measurement result of CRS by UE 100, and
  measurement result by the UE 100 from resources configured in CSI-IM-Config.

The communication entity 300 may transmit a coordination pattern to the radio access point 120 in operation S450.

The radio access point 120 schedules the UE 100 based on the received coordination pattern in operation S460.

Release 11 of 3GPP allows the UE to report the results measured from more resource element (RE) or more RE set or group than the UE before Release 11, so that the UE 100 can make a report for various channel states and interference conditions. It should be understood that one RE set or group may be one RE. For example, one RE set or group may include at least one RE. More specifically, the UE 100 of transmission mode (TM) 10 may report the measurement result about at least one of the following:
  Maximum three CSI-RS RE sets or groups, configured to use non-zero transmission power,
  Maximum four CSI-RS RE sets or groups, configured to use zero transmission power, and
  Maximum three CSI-IM RE sets or groups.

On the contrary, the UE 100 less than TM 9 do not support CSI-IM RE set or group and a number of CSI-RS RE sets or groups. The UE of TM 9 may report the measurement result from one RE set or group set as csi-RS-r10.

As described above, it may be important to detect information about the interference condition and channel state of the UE 100 when there are various patterns of coordination in order to make coordination between radio access points 120. After detecting the interference condition and channel state of the UE 100, the communication entity 300 may calculate a proper coordination pattern based on the detections.

In operation S470, the radio access point 120 may notify the communication entity 300 of information about the allocation of wireless resources scheduled for the UE 100 in operation S460.

Figure 5:
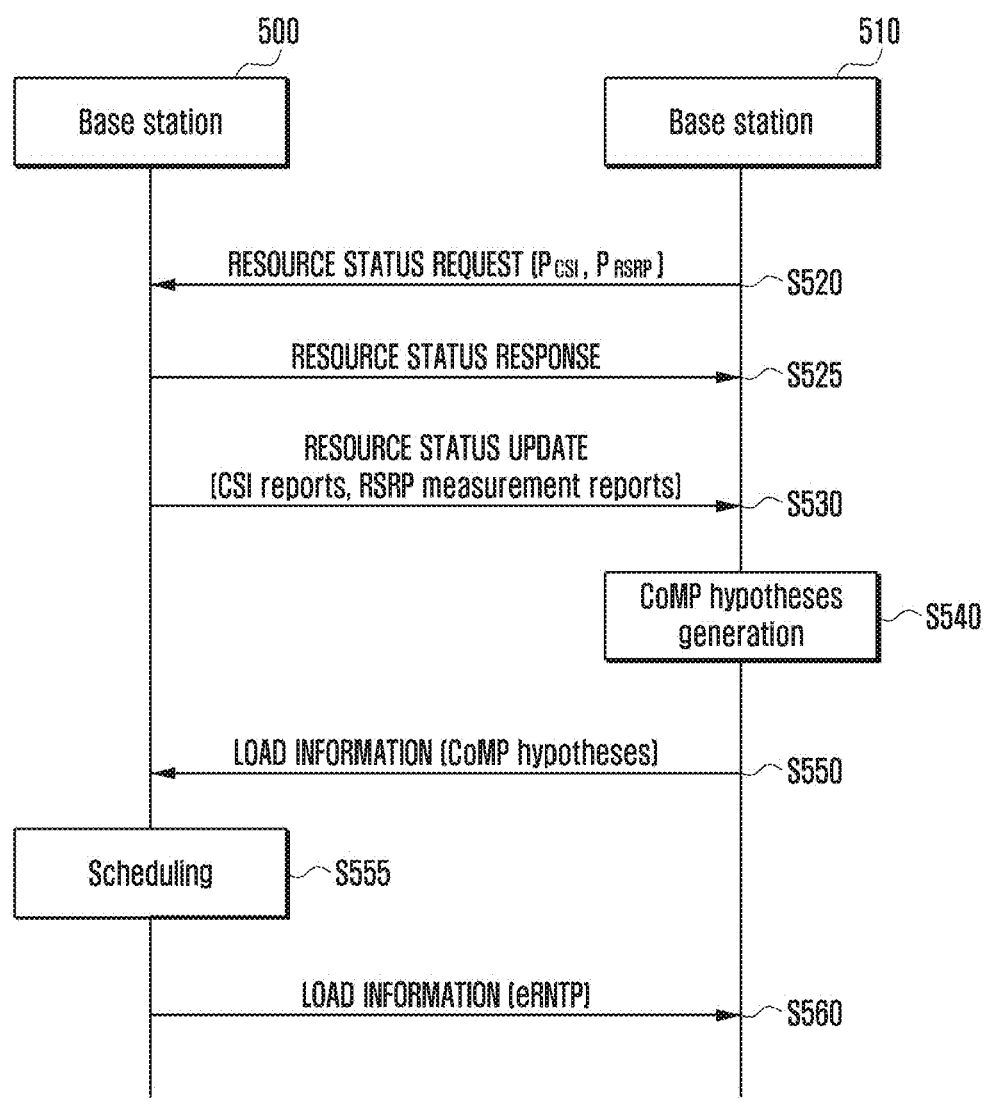
FIG. 5 is a flow diagram that describes communication between base stations (eNBs), or inter-eNB communication, according to a first embodiment of the present disclosure.

FIG. 5 is a flow diagram that describes communication between base stations, inter-eNB communication, according to a first embodiment of the present disclosure.

Referring to FIG. 5, a flow diagram that describes a method of exchanging information required for inter-eNB cooperative communication (inter-eNB CoMP) between radio access points 120 is illustrated. For the sake of convenience, the embodiment is described, based on eNB or Base Station as one of the examples of the radio access point 120. In this description, for the sake of convenience, the terms, eNB and base station, will be used in the same sense. It should, however, be understood that the present disclosure is not limited by the term, eNB or base station, and may also be applied to a number of objects as examples of the radio access point 120 described above.

In order to exchange information between base stations 500 and 510, one base station 510 may receive channel information, and the like, from another base station 500 in operation S530. The base station 510 may transmit resource allocation information (CoMP hypotheses) to the base station 500, based on collected information in operation S550. The following two paragraphs describe the main content of the present disclosure.

The channel information may include a reference signal received power (RSRP) measurement report and/or CSI report. Benefit metric may be transmitted to the base station 510. The current standard has defined a transmission method for the RSRP measurement report and benefit metric, but has not defined a transmission method for CSI report. Therefore, a standard is required to transmit CSI report between base stations.

The base station 510 may transmit CoMP information through a message, LOAD INFORMATION, to the base station 500 as in operation S550. For example, the base station 510 may transmit resource allocation information, CoMP hypotheses, to the base station 500. For a smooth CoMP process, the base station 500 complies with CoMP information generated by the base station 510, i.e., CoMP hypotheses. However, since connection between base stations is generally established in peer-to-peer, one base station cannot make a command to the other base station. Accordingly, it is necessary for the base station 500 to provide the base station 510 feedback about how the base station 500 complies with the received resource allocation information, CoMP hypotheses. Therefore, the base station 500 needs to represent the feedback as an enhancement of enhanced-relative narrowband transmission power (RNTP).

As described above, the present disclosure provides a method of providing feedback about the CoMP information received by the base station 500. More specifically, the present disclosure provides a method of improving RNTP IE, so that the base station 500 can provide the other base station 510 with feedback by sub-frames. In addition, the present disclosure provides a method that adds, application time point information (starting system frame number (SFN)/subframe index), in order to inform the information about a corresponding time point although latency varies between a number of base stations 500 and base station 510, so that the application time point information received by the base station 510 informs a corresponding subframe with the feedback.

Referring to FIG. 5, a description about an inter-eNB CoMP process is described as follows.

The base station 510 may transmit a message, RESOURCE STATUS REQUEST, to the base station 500 in operation S520. In this case, the base station 510 may request to collect information for performing inter-eNB CoMP. The base station 510 may inform the base station 500 of the type of request information and the reporting period of the request information through the message. The type of request information may be informed of by report characteristics IE. When the request information is CSI report, the reporting period of the request information may be informed of by Reporting Periodicity of CSI Report IE. Since the CSI report is short-term channel information, the reporting period may be relatively short. An available reporting period for the CSI report may be selected from at least one of the following: 5 ms, 10 ms, 20 ms, 40 ms, and 80 ms. The reporting period for the CSI report is relatively short, while the reporting period for RSRP measurement report is selected from 120 ms, 240 ms, 480 ms, and 640 ms.

After receiving the reporting period for the CSI report through the RESOURCE STATUS REQUEST, the base station 500 may use the value of the reporting period to determine the minimum interval for transmitting a RESOURCE STATUS UPDATE message containing CSI report two of which are consecutively generated. When the value of the reporting period is used to determine the minimum interval, it suggests that the base station 500 may transmit, if there are conditions (e.g., overload, no need for transmission due to small variation of channel, no UE that will make a report, and the like), a CSI report at an interval greater than the value of the reporting period for the received CSI report.

The base station 510 may also inform the base station 500 information about a cell that the base station 510 wants to receive, through Cell To Report IE. In addition, a non-periodic item may be added to a message for Resource Status Reporting Initiation.

In order for the base station 500 to start the requested measurement, the RESOURCE STATUS REQUEST messages to be transmitted the base station 510 may be configured as the following Tables 1, 2 and 3, for example. For example, information may be collected according to the parameters described in the following Tables 1, 2, and 3. In the Tables 1, 2, and 3, eNB1 and eNB2 correspond to base station 500 and base station 510, respectively. It should be understood that the following Tables 1, 2, and 3 are only examples to describe the present disclosure and the RESOURCE STATUS REQUEST messages may be transmitted in modes that differ from part or all of the Tables 1, 2, and 3.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement identifier (ID) | M | | INTEGER (1 . . . 4095, . . . ) | Allocated by eNB$_1$ | YES | reject |
| eNB2 Measurement ID | C-ifRegistration Request Stop | | INTEGER (1 . . . 4095, . . . ) | Allocated by eNB$_2$ | YES | ignore |
| Registration Request | M | | ENUMERATED (start, stop, . . . ) | A value set to "stop", indicates a request to stop all cells measurements. | YES | reject |
| Report Characteristics | O | | BITSTRING (SIZE(32)) | Each position in the bitmap indicates measurement object the eNB$_2$ is requested to report. First Bit = physical resource block (PRB) Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Xth Bit = CSI Feedback Periodic. Other bits shall be ignored by the eNB$_2$. | YES | reject |
| Cell To Report | | 1 | | Cell ID list for which measurement is needed | YES | ignore |

TABLE 1-continued

| IE/Group Name | Presence | Range | IE type and reference | Semantics description | Criticality | Assigned Criticality |
|---|---|---|---|---|---|---|
| >Cell To Report Item | | 1 ... <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, ...) | | YES | ignore |
| Partial Success Indicator | O | | ENUMERATED (partial success allowed, ...) | Included if partial success is allowed | YES | ignore |
| Reporting Periodicity for CSI Feedback periodic | O | | ENUMERATED (5 ms, 10 ms, 20 ms, 40 ms, 80 ms, ...) | | | |

TABLE 2

| Range bound | Explanation |
|---|---|
| maxCellineNB | Maximum no. cells that can be served by an eNB. Value is 256. |

TABLE 3

| Condition | Explanation |
|---|---|
| ifRegistrationRequestStop | This IE shall be present if the Registration Request IE is set to the value "stop". |

The base station 500 may transmit a response message to the base station 510, in response to RESOURCE STATUS REQUEST message, in operation S525. The response message may include RESOURCE STATUS RESPONSE message. The base station 500 may inform the base station 510 a condition as to whether the base station 500 may report information requested by the base station 510, through the RESOURCE STATUS RESPONSE message. For the information impossible to be reported, the base station 500 may inform the base station 510 the type of the information through Measurement Failed Report Characteristics IE and the cause impossible to be reported through Cause IE.

The RESOURCE STATUS RESPONSE message may be configured as the following Tables 4 and 5, for example. For example, a condition may be shown as to whether to successfully start collecting information requested by the RESOURCE STATUS REQUEST message according to the parameters described in the following Tables 4 and 5. In the Tables 1, 2, and 3, eNB1 and eNB2 correspond to base station 500 and base station 510, respectively. It should be understood that the following Tables 4 and 5 are only examples to describe the present disclosure and the RESOURCE STATUS RESPONSE messages may be transmitted in modes that differ from part or all of the Tables 4 and 5.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ...) | Allocated by $eNB_1$ | YES | reject |
| eNB2 Measurement ID | M | | INTEGER (1 ... 4095, ...) | Allocated by $eNB_2$ | YES | reject |
| Criticality Diagnostics | O | | 9.2.7 | | YES | ignore |
| Measurement Initiation Result | | 0 ... 1 | | List of all cells in which measurement objects were requested, included when indicating partial success | YES | ignore |
| >Measurement Initiation Result Item | | 1 ... <maxCellineNB> | | | EACH | ignore |
| >>Cell ID | M | | ECGI 9.2.14 | | — | — |
| >>Measurement Failure Cause List | | 0 ... 1 | | Indicates that $eNB_2$ could not initiate the measurement for at least one of the requested measurement objects in the cell | — | — |
| >>>Measurement Failure Cause Item | | 1 ... <maxFailedMeasObjects> | | | EACH | ignore |
| >>>>Measurement Failed Report Characteristics | M | | BITSTRING (SIZE(32)) | Each position in the bitmap indicates measurement object that failed to be initiated in the $eNB_2$. First Bit = PRB Periodic, Second Bit = TNL load Ind Periodic, Third Bit = HW Load Ind Periodic, | — | — |

TABLE 4-continued

| IE/Group Name | Presence | Range | IE type and reference | Semantics description | Criticality | Assigned Criticality |
|---|---|---|---|---|---|---|
| | | | | Fourth Bit = Composite Available Capacity Periodic, Fifth Bit = ABS Status Periodic, Xth Bit = CSI Feedback Periodic. Other bits shall be ignored by the $eNB_1$. | | |
| >>>>Cause | M | | 9.2.6 | Failure cause for measurement objects for which the measurement cannot be initiated | — | — |

TABLE 5

| Range bound | Explanation |
|---|---|
| maxFailedMeasObjects | Maximum number of measurement objects that can fail per measurement. Value is 32. |
| maxCellineNB | Maximum no. cells that can be served by an eNB. Value is 256. |

When all information items requested by the base station 510 are impossible to be reported, the base station 500 may transmit a RESOURCE STATUS FAILURE message to the base station 510. The RESOURCE STATUS FAILURE message may be configured as the following Tables 6 and 7, for example. In the Tables, eNB1 and eNB2 correspond to base station 500 and base station 510, respectively. It should be understood that the following Tables 6 and 7 are only examples to describe the present disclosure and the RESOURCE STATUS FAILURE messages may be transmitted in modes that differ from part or all of the Tables 6 and 7.

TABLE 6

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 . . . 4095, . . . ) | Allocated by $eNB_1$ | YES | reject |
| eNB2 Measurement ID | M | | INTEGER (1 . . . 4095, . . . ) | Allocated by $eNB_2$ | YES | reject |
| Cause | M | | 9.2.6 | Ignored by the receiver when the Complete Failure Cause Information IE is included | YES | ignore |
| Criticality Diagnostics | O | | 9.2.7 | | YES | ignore |
| Complete Failure Cause Information | | 0 . . . 1 | | Complete list of failure cause for all requested cells | YES | ignore |
| >Complete Failure Cause Information Item | | 1 . . . <maxCellineNB> | | | EACH | ignore |
| >>Cell ID | M | | ECGI 9.2.14 | | — | — |
| <<Measurement Failure Cause List | | 1 | | | — | — |
| >>>Measurement Failure Cause Item | | 1 . . . <maxFailedMeasObjects> | | | EACH | ignore |
| >>>>Measurement Failed Report Characteristics | M | | BITSTRING (SIZE(32)) | Each position in the bitmap indicates measurement object that failed to be initiated in the $eNB_2$. First Bit = PRB Periodic, Second Bit = TNL load Ind Periodic, Third Bit = HW Load Ind Periodic, Fourth Bit = Composite Available Capacity Periodic, Fifth Bit = ABS Status Periodic, Xth Bit = CSI Feedback Periodic. Other bits shall be ignored by the $eNB_1$. | — | — |
| >>>>Cause | M | | 9.2.6 | Failure cause for measurements that cannot be initiated | — | — |

TABLE 7

| Range bound | Explanation |
|---|---|
| maxCellineNB | Maximum no. cells that can be served by an eNB. Value is 256. |
| maxFailedMeasObjects | Max number of measurement objects that can fail per measurement. Value is 32. |

The base station 500 may report information items requested by the base station 510 in operation S530. The reporting may be performed by transmitting a RESOURCE STATUS UPDATE message. The base station 500 may use a value (values) of reporting period received from the base station 510 as a transmission interval for the RESOURCE STATUS UPDATE message.

The RESOURCE STATUS UPDATE message may contain CSI Report IE and/or RSRP Measurement Report List IE. Since the CSI report and an RSRP measurement report have respective reporting periods that differ from each other, a RESOURCE STATUS UPDATE message may contain only one of the CSI Report IE and an RSRP Measurement Report List IE. The RESOURCE STATUS UPDATE message may be configured as the following Tables 8 and 9, for example. In the Tables 8 and 9, eNB1 and eNB2 correspond to base station 500 and base station 510, respectively. It should be understood that the following Tables 8 and 9 are only examples to describe the present disclosure and the RESOURCE STATUS UPDATE messages may be transmitted in modes that differ from part or all of the Tables 8 and 9.

The UE identifier may be used to bind information reference signal receive power (RSRP) measurement report and CSI report about the UE that the base station 500 provides services to. As described above, the base station 500 may receive RSRP measurement report from the base station 510, as well as CSI report. Like the CSI report, the RSRP measurement report is information received from the UE that the base station 500 provides services to. The base station 500 may transmit the CSI report and an RSRP measurement report through the RESOURCE STATUS UPDATE messages that differ from each other, respectively. The base station 510 may need to consider the information (e.g., an RSRP measurement report and a CSI report) about the UE that the base station 500 provides services to, in order to achieve resource coordination. In this case, the base station 510 may consider the UE identifier contained in RSRP Measurement Report List IE and the UE identifier contained in CSI Report IE.

CSI report information by CSI processes may include CSI process configuring indexes. CSI process configuration may be various e.g., the CSI process configuration may be determined by a combination of CSI-RS configuration and CSI-IM configuration. However, it is not efficient to transmit all values related to CSI process configurations to the base station 510. When the base station 500 provides various CSI process configurations to the UE devices, the base station 500 causes frequency signaling between the UE devices and the base station 500, and thus the providing method is not recommended. Therefore, it is recommended that CSI process configurations corresponding to a certain number of

TABLE 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 . . . 4095, . . . ) | Allocated by eNB$_1$ | YES | reject |
| eNB2 Measurement ID | M | | INTEGER (1 . . . 4095, . . . ) | Allocated by eNB$_2$ | YES | reject |
| Cell Measurement Result | | 1 | | | YES | ignore |
| >Cell Measurement Result Item | | 1 . . . <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>RSRP Measurement Report List | O | | 9.2.75 | | YES | ignore |
| >>CSI Feedback | O | | 9.2.xx | | YES | ignore |

TABLE 9

| Range bound | Explanation |
|---|---|
| maxCellineNB | Maximum no. cells that can be served by an eNB. Value is 256. |

The CSI Report IE may include CSI report information about one or more UE. More particularly, the CSI Report IE may be represented as a set of CSI report information by UE devices. The CSI report information represented by the UE devices may include CSI report information by CSI processes and UE identifiers. The UE identifier may be represented in the form of cell radio network temporary identifier (C-RNTI) of 16 bits. The UE identifier may also be represented in the form of an eNB UE X2 access point (AP) ID or in any new forms that have not been defined yet. The UE identifiers may be allocated by the base station 500.

CSI process configuration indexes have previously been stored in the base station 500 and base station 510 and then the CSI process configuration indexes are transmitted. In addition to CSI process configuration indexes by respective CSI processes, ranking index (RI), wideband channel quality indication (CQI), and subband CQI list may also be transmitted. The subband CQI list may include subband CQIs by respective subbands.

The following Tables 10 and 11 show one example of the configuration of the CSI Report IE. In the Tables 10 and 11, CSI report information by respective UE devices (CSI Information UE-Specific) may include the UE identifier (e.g., C-RNTI) and CSI report information by subbands (CSI Information Subband-Specific). The CSI report by subbands (CSI Information Subband-Specific) may include CSI report information by CSI processes (CSI Information CSI Process-Specific). The number of subbands to be reported may vary according to causes, such as a reporting period of CSI report for every bandwidth, and the like. When one subframe is formed with 110 PRBs, it will be appreciated that maximum number of subbands for CSI report is 14, considering that one subband is in general formed with 8 PRBs. The CSI report information by CSI processes (CSI Information CSI Process-Specific) may include subband CQI, optionally CSI process configuration index (CSI Process Index), wideband CQI, and ranking index (RI). The CSI process configuration index, wideband CQI, and RI need not to appear for each subband and need to appear once by each CSI process. It should be understood that the following Tables 10 and 11 are only an example to describe the present disclosure and the CSI Report IE may differ from part or all of the Tables 10 and 11.

information in operation S540. The base station 510 may transmit the generated information, CoMP hypotheses, to the base station 500 through the LOAD INFORMATION message in operation S550.

The base station 500 makes schedule for the real serving UE considering the received resource allocation information, CoMP hypotheses, in operation S555. In this case, the base station 500 may not always perform resource allocation based on the received resource allocation information, CoMP hypotheses.

The base station 500 may transmit, to the base station 510, information about how resources have actually been allocated or will be allocated in operation S560. The information may be transmitted through a message, LOAD INFORMATION. The base station 500 may inform the base station 510 of the resource allocation determining results by sub-frames

TABLE 10

| IE/Group Name | Presence | Range | IF type and reference | Semantics description |
|---|---|---|---|---|
| CSI Information(report) UE-Specific | | 1 . . . <max UECSIReport> | | |
| >C-RNTI | M | | BIT STRING (SIZE(16)) | ID of the UE served by the cell in eNB$_2$. Defined in TS 36.331 [9]. |
| >CSI Information(report) Subband-Specific | | 1 . . . <maxSubband> | | |
| >>CSI Information(report) CSI Process-Specific | | 1 . . . <maxCSIProcess> | | |
| >>>CSI Process Index | O | | INTEGER (0 . . . 31, . . . ) | |
| >>>Subband CQI | M | | BIT STRING (SIZE(2)) | Defined in TS 36.213 [11]. |
| >>>Wideband CQI | O | | BIT STRING (SIZE(4)) | Defined in TS 36.213 [11]. |
| >>>RI | O | | BIT STRING (SIZE(3)) | Defined in TS 36.213 [11]. |

TABLE 11

| Range bound | Explanation |
|---|---|
| maxUECSIReport | Maximum number of UE measurement reports. Value is FFS. |
| maxSubband | Maximum number of subbands. The value is 14. |
| maxCSIProcess | Maximum number of CSI processes. The value is 4. |

In the following description, another example of the configuration of the CSI Report IE is explained. The CSI report information represented by respective UE devices (CSI Information (report) UE-Specific) includes the UE identifier (C-RNTI) and CSI report information by CSI processes (CSI Information (report) CSI Process-Specific). The CSI report information by CSI processes (CSI Information (report) CSI Process-Specific) may include CSI report by subbands (CSI Information (report) Subband-Specific). The CSI report by subbands (CSI Information (report) Subband-Specific) may include subband CQI, optionally CSI process configuration index (CSI Process Index), wideband CQI, and RI.

In addition, the base station 510 may have received benefit metric information through a message, LOAD INFORMATION, in addition to the CSI report and an RSRP measurement report.

The base station 510 may generate resource allocation information, CoMP hypotheses, by using the received report and PRBs through RNTP IE contained in the LOAD INFORMATION. The resource allocation determining results by sub-frames and PRBs may be transmitted in the form of two dimensional array. In addition, like the resource allocation information, the resource allocation determining results may be processed and transmitted in the form of one dimensional bitmap.

In connecting between the base station 500 informing the resource allocation determining results and the base station 510, transmission latency may exist. Since transmission latency may vary each time transmission is performed, the base station 510 may not surely identify a time point from which the resource allocation determining results by sub-frames and PRBs are valid. Therefore, the application time point information, starting SFN/subframe index, mays also be transmitted. When the base station 510 ascertains that the application time point is not included in the resource allocation determining results, the base station 510 may consider the results to be valid immediately after receiving them. For example, the RNTP IE may be configured as the following Tables 12 and 13. It should be understood that the following Tables 12 and 13 are only examples to describe the present disclosure and the RNTP IE may differ from part or all of the Tables 12 and 13.

TABLE 12

| IE/Group Name | Presence | Range | IE type and reference | Semantics description | Criticality | Assigned Criticality |
|---|---|---|---|---|---|---|
| RNTP Per PRB | M | | BIT STRING (6 . . . 110, . . . ) | Each position in the bitmap represents a $n_{PRB}$ value (i.e., first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB in case the DL power restriction is static, i.e., the DL power restriction in a cell is maintained as the subframe number changes. | — | — |
| RNTP Threshold | M | | ENUMERATED (−∞, −11, −10, −9, −8, −7, −6, −5, −4, −3, −2, −1, 0, 1, 2, 3, . . . ) | $RNTP_{threshold}$ is defined in TS 36.213 [11]. | — | — |
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . . ) | $P_B$ is defined in TS 36.213 [11]. | — | — |
| PDCCH Interference Impact | M | | INTEGER (0 . . . 4, . . . ) | Measured by Predicted Number Of Occupied PDCCH OFDM Symbols (see TS 36.211 [10]). Value 0 means "no prediction is available". | — | — |
| RNTP Per PRB Per Subframe | | 0 . . . <maxSubframe> | | The first item in the list corresponds to the first subframe, the second to the second subframe, and so on. Applied repeatedly, if available. This IE is not used if the DL power restriction is static. | | |
| >RNTP Per PRB Subframe-Specific | M | | BIT STRING (6 . . . 110, . . . ) | Each position in the bitmap represents a $n_{PRB}$ value (i.e., first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the corresponding subframe. | | |
| Starting SFN | M | | INTEGER (0 . . . 1023, . . . ) | Number of the first system frame from which the RNTP Per PRB Per Subframe IE is valid. | | |
| Starting Subframe Index | M | | INTEGER (0 . . . 9, . . . ) | Index of the first subframe from which the RNTP Per PRB Per Subframe IE is valid. | | |

TABLE 13

| Range bound | Explanation |
|---|---|
| maxSubframe | Maximum number of subframes. Value is FFS. |

The base station 510 may use the received RNTP IE in determining resource allocation information later.

Figure 6:
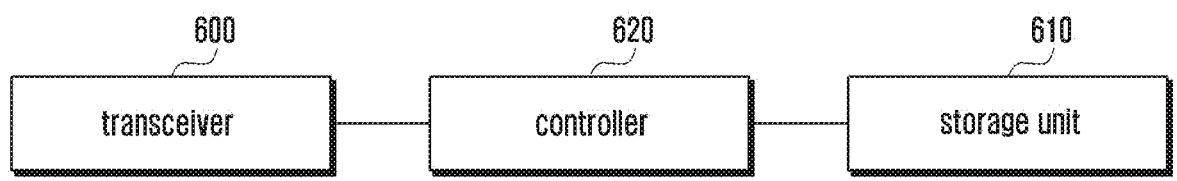
FIG. 6 is a block diagram of a base station according to an embodiment of the present disclosure.

FIG. 6 is a block diagram of a base station according to an embodiment of the present disclosure.

Referring to FIG. 6, the base station may include a transceiver 600, a storage unit 610 and a controller 620.

The transceiver 600 may perform transmission/reception of information required to perform operations according to the first embodiment of the present disclosure. The transceiver 600 may transmit/receive a resource status request message to/from other base station. The resource status request message may include information for requesting CSI report. The transceiver 600 may transmit/receive a resource status response message or a resource status update message to/from other base station. The resource status response message or resource status update message may include information about CSI report.

In addition, the transceiver 600 may transmit/receive a load information message including resource allocation information, CoMP hypotheses. The transceiver 600 may transmit information indicating whether to comply with the received resource allocation information by using eRNTP.

The storage unit 610 may store information required for the operations of the base station. The storage unit 610 may store information that the transceiver 600 has received or transmitted.

The controller 620 may control the states and operations of the components in the UE.

The controller 620 may control reception of a first message for requesting CSI report from other base station, and transmission of a second message including the CSI report, based on the first message, to the other base station.

The controller 620 may control reception of a third message including first information about resource allocation based on the CSI report, from the other base station, allocation of resources to UE, and transmission of a fourth message including second information indicating whether to comply with the resource allocation information received from the other base station when the first base station makes a resource allocation to the other base station.

The controller 620 may control transmission of a response message including fourth information about whether the reporting of the CSI report fails to the other base station. The CSI report may include a periodic CSI report. The first message may include the third information about the reporting period of the CSI report.

In addition, the controller 620 may control transmission of a first message for requesting channel state information (CSI) report to other base station, and reception of a second message including the CSI report, based on the first message, from the other base station.

The controller 620 may generate first information about the resource allocation based on the received CSI report, transmission of a third message including the first information to the other base station, and reception of a fourth message including second information indicating whether to comply with the resource allocation information received from the second base station when the first base station makes a resource allocation from the other base station.

The controller 620 may further control reception of a response message including fourth information about whether the reporting of the CSI report fails from the other base station. The CSI report may include a periodic CSI report. The first message may include the third information about the reporting period of the CSI report.

In addition, the CSI report includes an identifier of UE, a Subband-Specific CSI report, and a CSI Process-Specific CSI report. The CSI report of CSI Process-Specific includes at least one of the following: subband CQI, wideband CQI, and RI.

The second information may include subframe specific information. The subframe specific information may include a starting system frame number and/or a starting subframe index. The starting system frame number may indicate a system frame to which the second information is applied. The starting subframe index may be indicated to a subframe to which the second information is applied.

The first message includes a resource status request message. The second message includes a resource status update message. The third and fourth messages include load information messages. The second information included in the fourth message is included in RNTP.

Figure 7:
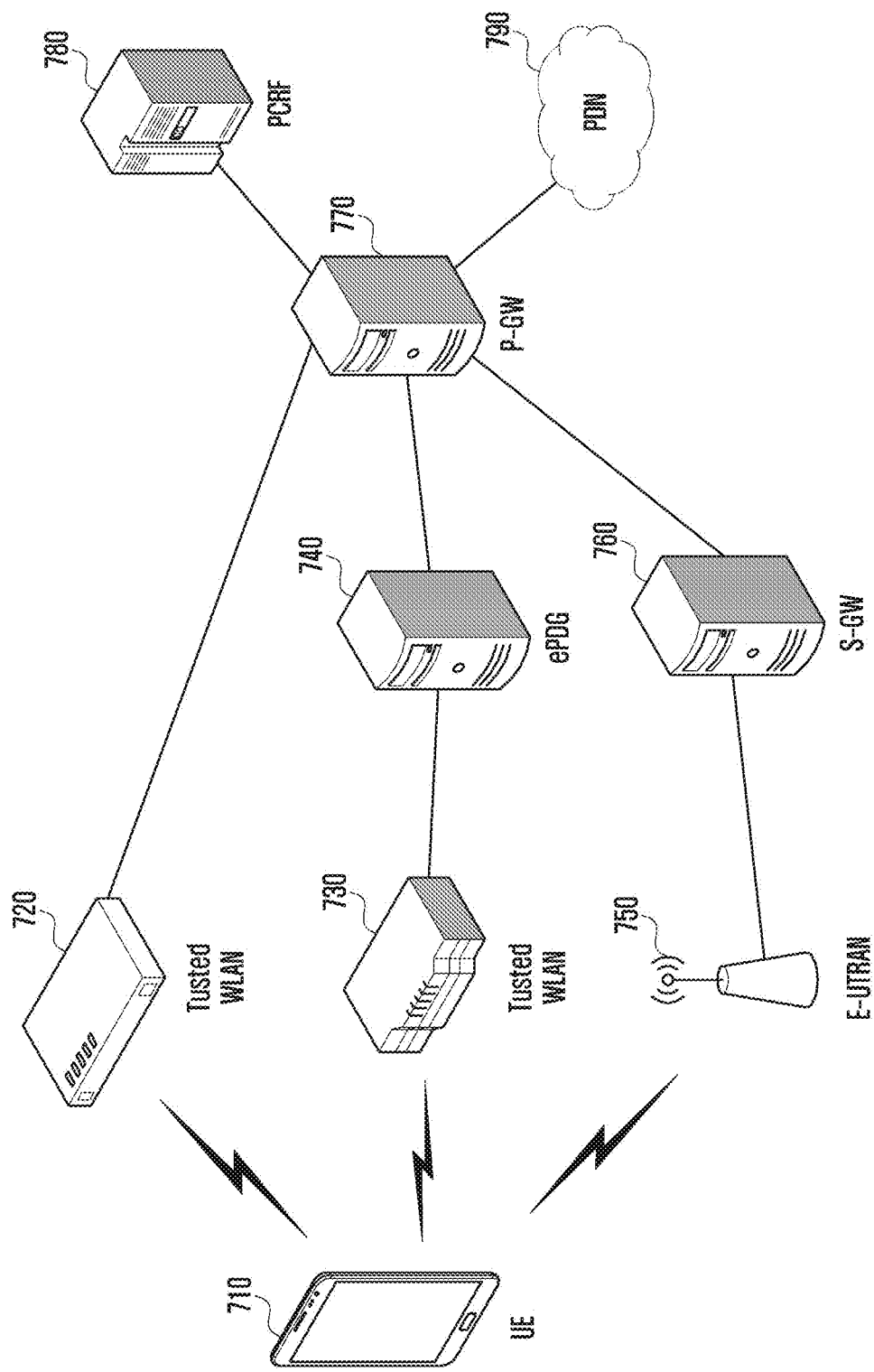
FIG. 7 is a diagram illustrating an environment where a UE transmits and receives data over both of a 3GPP access network and a non-3GPP access network according to an embodiment of the present disclosure.

FIG. 7 is a diagram illustrating an environment where a UE transmits and receives data over both of a 3GPP access network and a non-3GPP access network according to an embodiment of the present disclosure.

Referring to FIG. 7, although the embodiment of the present disclosure describes the non-3GPP access network based on wireless local area networks (WLANs) 720 and 730, it should be understood that the non-3GPP access network may also include other types of non-3GPP standard access network, e.g., a 1×/code division multiple access (CDMA2000)/high rate packet data (HRPD) access network, a worldwide interoperability for microwave access (WiMAX) network, and the like.

The non-3GPP access network may be divided into a trusted non-3GPP access network 720 and an untrusted non-3GPP access network 730. The division may be determined according to whether a service company trusts a non-3GPP access network connected to the service company's network. When the service company does not trust a non-3GPP access network (i.e., untrusted non-3GPP access network 730), the non-3GPP access network may be connected to the 3GPP service company's network, e.g., a P-GW 770, through evolved packet data gateway (ePDG) 740. In an embodiment of the present disclosure, the service company may include a 3GPP access network operator, and the non-3GPP access network may be a service provider contracting with a 3GPP company.

On the contrary, the trusted non-3GPP access network 720 may be directly connected to the P-GW 770, not through the ePDG 740. As such, the trusted non-3GPP access network 720 may be directly connected to the evolved packet core (EPC).

Although the embodiment of FIG. 7 is implemented in such a way that the non-3GPP access networks 720 and 730 are, for the sake of convenience, represented as a single device, it should be understood that the non-3GPP access networks may be a network including a number of access points. More particularly, when a trusted non-3GPP access network 720 is configured with WLAN, it is called trusted WLAN access network (TWAN) 720. In this case, the TWAN 720 may include one or more wireless fidelity (Wi-Fi) access points and trusted WLAN access gateway (TWAG).

For example, the Wi-Fi access point may be connected to a 3GPP service company's network through TWAG. The TWAG may be implemented in such a way as to be physically separated from the Wi-Fi access point, or as an additional logic module on a device.

Referring to FIG. 7, a UE 710 may also use a non-seamless WLAN offloading (NSWO) technology for directly transmitting/receiving traffic to/from an external public data network (PDN) (e.g., the Internet), not through a service company's core network, but through a trusted WLAN 720 or an untrusted WLAN 730.

In an embodiment of the present disclosure, the 3GPP mobile communication system, in particular, LTE system, may include a next generation base station 750 (e.g., an evolved universal mobile telecommunications system terrestrial radio access network (EUTRAN), an eNB, a Node B, and the like) and a serving gateway (S-GW) 760. The UE 710 may be connected to an external network through the eNB 750, the S-GW 760, and the PDN Gateway (P-GW) 770. A P-GW includes policy and charging enforcement function (PCEF). If PCEF is implemented to be separated from P-GW, the embodiment of the present disclosure may be implemented in such a way that P-GW is replaced with PCEF.

A policy and charging rules function (PCRF) 780 is a device for controlling policy related to a user's quality of service (QoS). A policy and charging control (PCC) rule corresponding to a policy is transmitted to the P-GW 770.

The eNB 750 is a RAN and may perform functions corresponding to an RNC of a universal terrestrial radio access network (UTRAN) system and a base station controller (BSC) of a GSM EDGE radio access network (GERAN) system. The eNB 750 is connected to the UE 710 through a wireless channel and performs functions as existing RNC/BSC. In addition, the eNB 750 may simultaneously use a number of cells. Therefore, when the eNB 750 (e.g., the E-UTRAN) is replaced with UTRAN or GERAN, various embodiments of the present disclosure may be applied to a second generation (2G)/3G legacy network.

The S-GW 760 is a device that provides data bears. The S-GW 760 may generate or remove data bearer context according to the control of MME. The functions of the S-GW 760 may correspond to those of SGSN in 2G/3G network.

The unit of QoS available to wireless communication systems, such as LTE, is an evolved packet system (EPS) bearer. One EPS bearer is used to perform transmission of internet protocol (IP) Flows with the same QoS requirement. An EPS bearer has QoS-related parameters in which QoS class identifier (QCI) and allocation and retention priority (ARP) may be included.

In an embodiment of the present disclosure, the EPS bearer may correspond to PDP context of GPRS system. When the UE 710 is connected to evolved packet core (EPC) through a 3GPP or non-3GPP access network, a PDN connection 790 is generated. The PDN connection 790 may include one or more EPS bearers, the IP addresses of which may be allocated according to PDN connections. In the following description, the term 'PDN connection' or 'connection' may be used in the sense of a concept including a logic path that allows the UE 710 to exchange data with PDN, through a core network, based on an IP address.

When Wi-Fi and 3GPP access networks are available on the network described above, an offloading control method may be divided into a method of using information provided by base station and a method of using information provided by core network. The offloading control information provided by base station, called RAN rule or RAN assistant information, includes, when the UE selects a Wi-Fi network or traffic is transmitted through a Wi-Fi network or 3GPP access network which is selected, conditions or information to determine one of the networks in order to transmit traffic. The offloading control information provided by base station may be broadcast to all UE devices under the coverage areas of the base station through system information block (SIB) or may be transmitted to a particular UE device through RRC message. The offloading control information provided by core network is information that is determined by a network entity of a core network, e.g., a PCRF or a PCEF, and may be transmitted to the UE so as to affect the offloading operations of the UE. The offloading control information may be called an offloading rule or offloading policy.

When a Wi-Fi offloading function is available to UE, there may be two paths for making a decision for Wi-Fi offloading control and transmitting the decision to the UE. When the UE simultaneously receives Wi-Fi offloading control information items from a core network and a base station, and the received Wi-Fi offloading control information items differ from each other, the UE has difficulty in performing an offloading operation based on which one of the received information items.

In order to address these issues, the present disclosure provides various methods as embodiments. For example, when offloading control information items are simultaneously received from a core network and a base station, the methods according to the present disclosure prioritizes between the received offloading control information items and performs an offloading operation based on an offloading control inform item with a higher order of priority.

Figure 8:
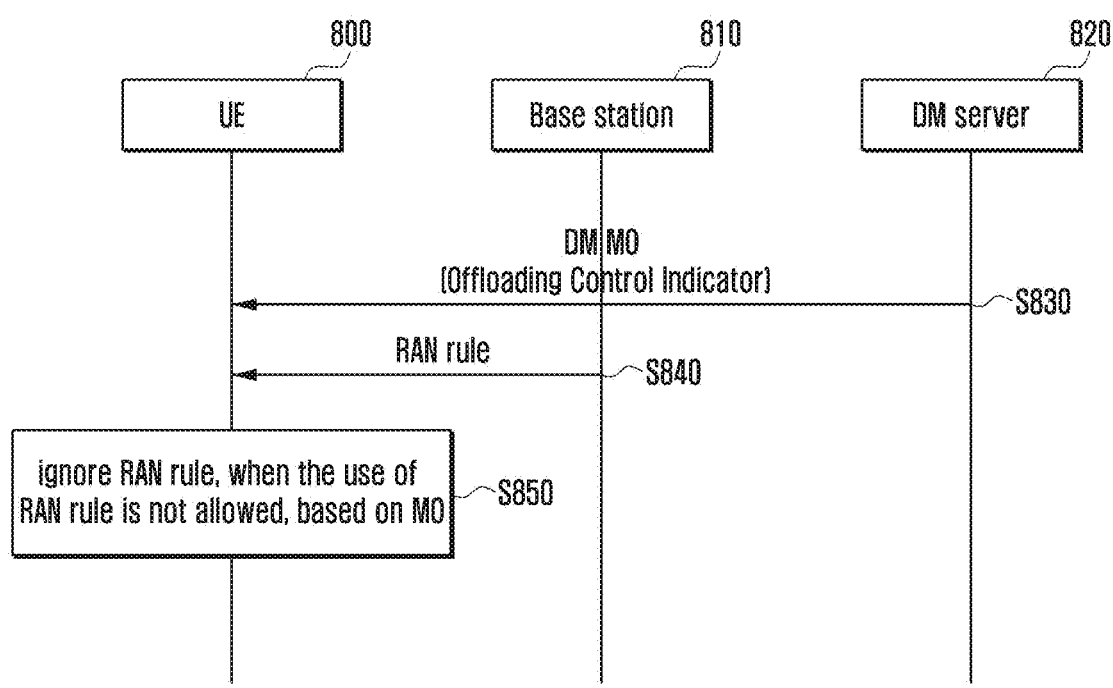
FIG. 8 is a flow diagram that describes a method of configuring offloading control management of a device, by using device management (DM) management object (MO), according to a second embodiment of the present disclosure.

FIG. 8 is a flow diagram that describes a method of configuring offloading control management of a device, by using device management (DM) management object (MO) according to a second embodiment of the present disclosure.

Referring to FIG. 8, a DM server 820 configures MO and transmits the offloading control management information to a UE 800 in operation S830. The MO is information encoded according to the MO structure of an orthogonal multiple access (OMA) DM, and may be network attached storage (NAS) MO as a typical example. The offloading control management information of the MO may include at least one of the following: a condition as to whether the UE 800 uses offloading control information provided by base station, and information about a relative order of priority between offloading control information provided by core network and offloading control information provided by base station.

The UE 800 receives MO containing offloading control management information and determines whether to use offloading control information provided by core network or a base station, based on the offloading control management information. For example, when the UE 800 receives information indicating that offloading control information provided by base station is not allowed to be used from the DM server 820, the UE 800 receives offloading control information provided by base station from a base station 810 in operation S840. However the UE 800 ignores the received offloading control information in operation S850. When the order of priority between the offloading control information items is determined based on the offloading control management information, the UE 800 needs to apply the offloading control information with a higher order of priority to the offloading operation.

Figure 9:
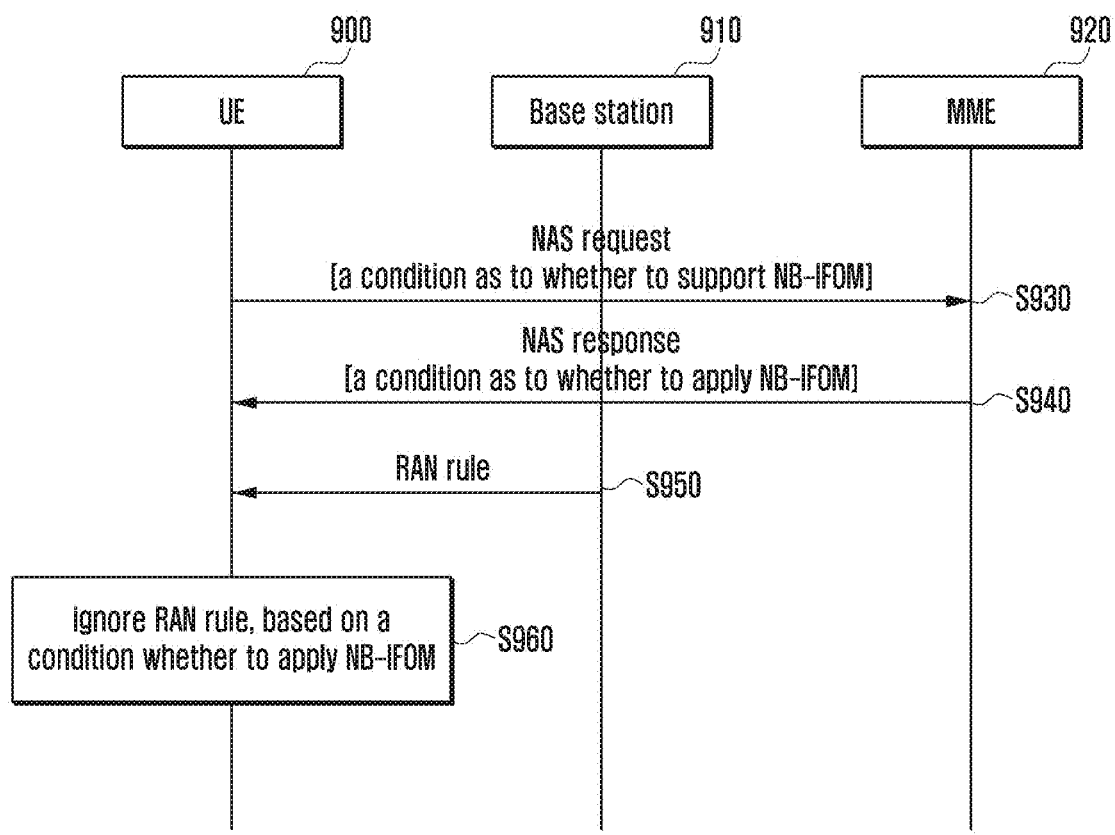
FIG. 9 is a flow diagram that describes a method of determining offloading control management by exchanging network attached storage (NAS) messages, according to a third embodiment of the present disclosure.

FIG. 9 is a flow diagram that describes a method of determining offloading control management by exchanging NAS messages, according to a third embodiment of the present disclosure.

Referring to FIG. 9, the embodiment is described, assuming that, when offloading control information provided by core network can be used, a UE 900 performs an offloading operation by using the offloading control information provided by core network. For example, the offloading control information provided by core network has a higher order of priority than the offloading control information provided by base station.

When the UE 900 may use a core network offloading control function, the UE 900 transmits, to an MME 920, a NAS request message (e.g., an attach request message or a tracking area update (TAU) request message) containing a condition as to whether to support an offloading control function provided by core network or a network-based offloading control function in operation S930. The core network offloading control function may include a network based IP flow mobility (NB-IFOM) function, i.e., network (NW)-initiated NBIFOM function.

The MME 920 determines whether to allow the UE 900 to use offloading control information provided by core network, considering at least one of the subscription information, a core network, and a condition as to whether the UE 900 supports a core network offloading control function, and transmits, to the UE 900, the NAS response message (e.g., an attach accept message or a TAU accept message) with the determined result in operation S940.

The UE 900 receives, from a base station 910, the offloading control information provided by the base station 910 in operation S950. When a determination is made to use core network offloading control information by the received NAS response message, the base station 910 ignores the information in operation S960. On the contrary, when a determination is made not to use the core network offloading control information, the offloading control information provided by the base station 910 is used.

Figure 10:
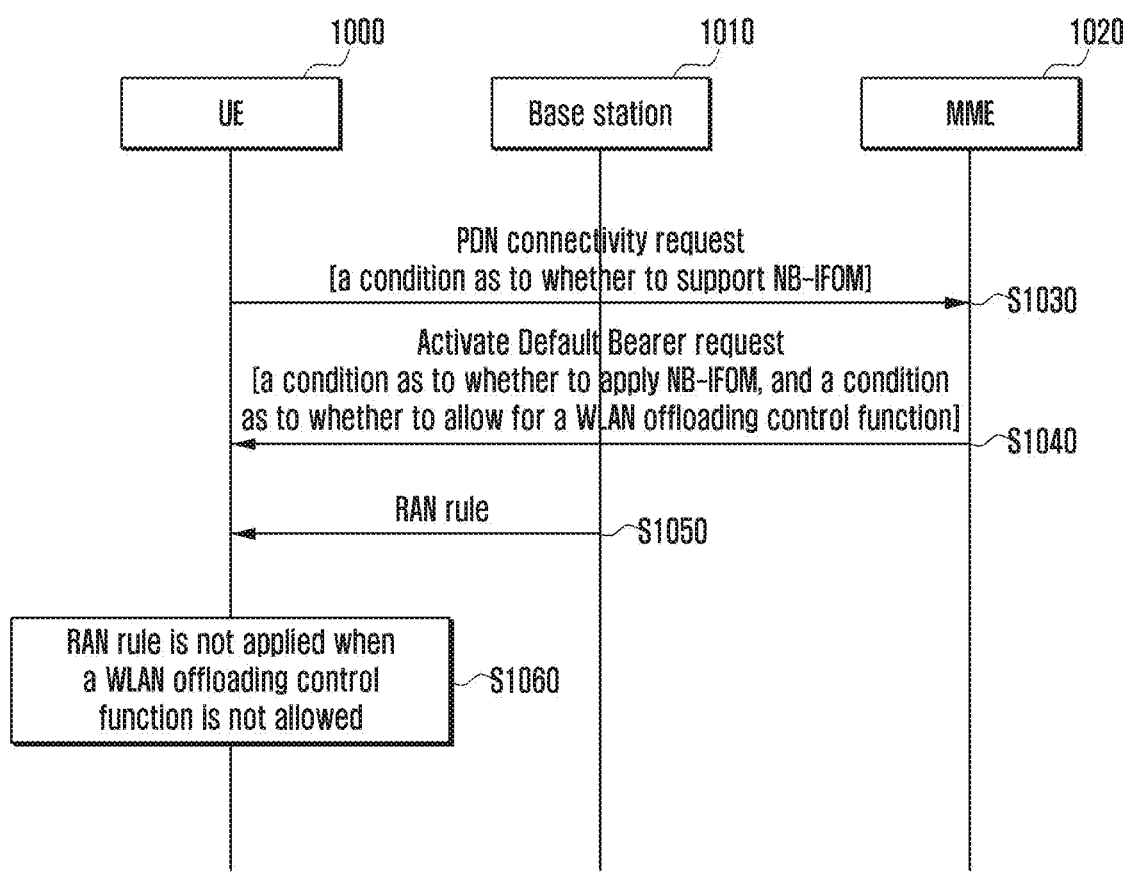
FIG. 10 is a flow diagram that describes a method using wireless local area network (WLAN) offloadabilitiy according to a fourth embodiment of the present disclosure.

FIG. 10 is a flow diagram that describes a method using WLAN offloadabilitiy according to a fourth embodiment of the present disclosure.

Referring to FIG. 10, when an offloading control function provided by core network is used for a UE 1000, an MME 1020 may inform the UE 1000 of that an offloading control function provided by core network is used, by not configuring WLAN offloadbility indicating a condition as to whether offloading is allowed for PDN connection according to offloading control information provided by base station, or by making a configuration as 'a configuration as ding cont and informs the UE 1000 of the configuration.

The UE 1000 transmits a PDN connectivity request message to establish PDN connection to the MME 1020 in operation S1030. When the establishment of PDN connection is required during the process of attach, the PDN connectivity request message is included in a attach request message. In addition, the PDN connectivity request message includes information about whether the UE 1000 supports a core network offloading control function or a network-based offloading control function (NB-IFOM or NW-initiated NBIFOM).

The MME 1020 determines whether to apply a core network offloading control function to the established PDN connection of the UE 1000, considering at least one of the subscription information, a core network, and a condition as to whether the UE 1000 supports a core network offloading control function, and transmits, to the UE 1000, the NAS response message (e.g., an activate default EPS bearer request) with the determination result in operation S1040. For example, the activate default EPS bearer request message that the MME 1020 transmits to the UE 1000 includes information indicating a condition as to whether a core network-based offloading control function is applied to the established PDN connection (and default EPS bearer that belonged to the connection).

In addition, when a core network-based offloading control is applied to the PDN connection, WLAN offloadability, representing information about whether base station-based WLAN offloading control function is allowed, is removed or WLAN offloadability is set as setfloadability allowed, is reto explicitly inform that base station-based WLAN offloading control function is not allowed, and then the set WLAN offloadability is transmitted.

The UE 1000 receives offloading control information provided by base station from a base station 1010 in operation S1050. When PDN connection does not exist to allow a WLAN offloading operation that has used offloading control information provided by base station according to the received information (i.e., WLAN offloadability has been set to be allowed), the UE 1000 does not use the received offloading control information provided by base station or may not receive the received offloading control information from the beginning in operation S1060.

Figure 11:
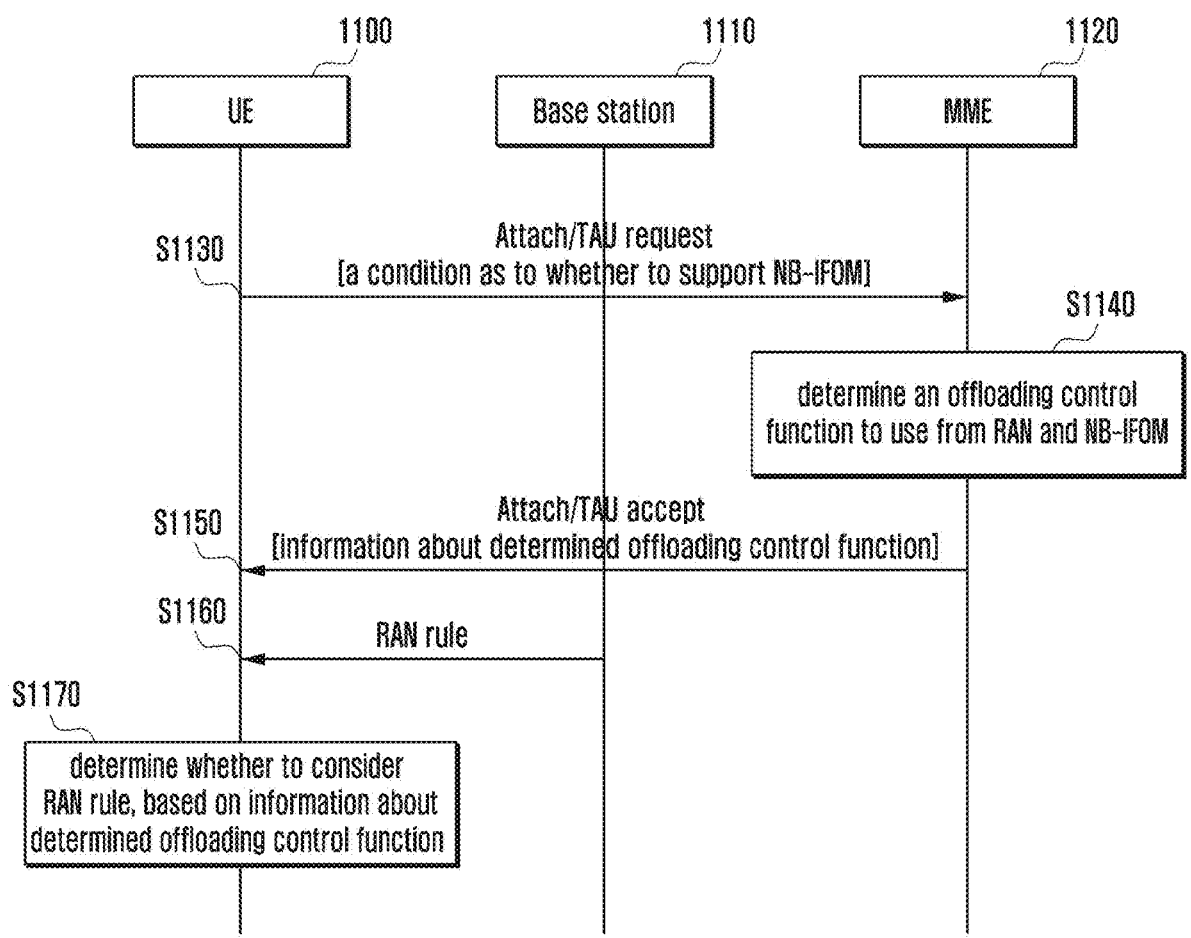
FIG. 11 is a flow diagram that describes a method of determining offloading control establishment by exchanging NAS messages, according to a fifth embodiment of the present disclosure.

FIG. 11 is a flow diagram that describes a method of determining offloading control establishment by exchanging NAS messages, according to a fifth embodiment of the present disclosure.

Referring to FIG. 11, a UE 1100 performs Attach or TAU process. During the process, the UE 1100 may transmit, to an MME 1120, information about whether to support offloading control function provided by base station as one of Radio capability in operation S1130. The attach request or TAU request message that the UE 1100 transmits to the MME 1120 includes information about whether to support a network-based offloading control function or an offloading control function provided by core network.

The MME 1120 determines one of the two functions as a function that the MME 1120 will use, based on information about whether to support an offloading control function provided by base station, which is received from a base station 1110 and included in UE radio capability, and information about whether to support an offloading control function provided by core network, directly received from the UE 1100 in operation S1140.

The MME 1120 includes information about which one of the offloading control function provided by base station and the offloading control function provided by core network the MME 1120 will use in the Attach or TAU response message and transmits the message with the information to the UE 1100 in operation S1150.

The UE 1100 may receive offloading control information provided by the base station 1110 in operation S1160. When a determination has been made to use an offloading control function provided by core network according to the received information, the UE 1100 does not use the received offloading control information provided by base station or may not receive the offloading control information from the beginning in S1170.

Although the embodiments have been described in such a way that, when the UE receives offloading control information from a base station, the UE determines whether to use the information, it should be understood that the disclosure is not limited to the embodiments. There may be a case that the UE does not have to use offloading control information provided by base station. In this case, the UE may not receive offloading control information provided by base station from the beginning. For example, the UE may omit the reception process for SIB17.

Figure 12:
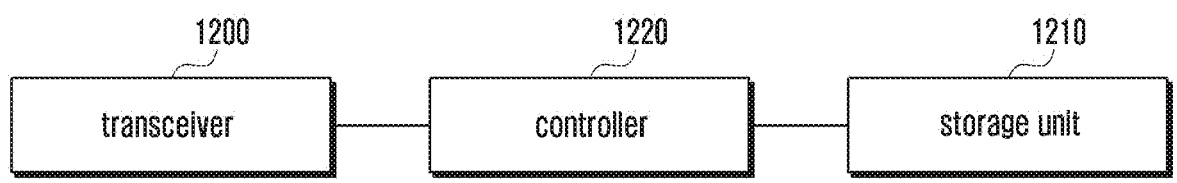
FIG. 12 is a block diagram of a user equipment (UE) according to a sixth embodiment of the present disclosure.

FIG. 12 is a block diagram of a UE according to a sixth embodiment of the present disclosure.

Referring to FIG. 12, the UE may include a transceiver 1200, a storage unit 1210 and a controller 1220.

The transceiver 1200 may perform transmission/reception of information that the UE needs to perform operations according to an embodiment of the present disclosure. More specifically, the transceiver 1200 may receive offloading control management information from a DM server, by using DM MO. The transceiver 1200 may also receive offloading control information from a base station or a core network. The transceiver 1200 may transmit a NAS request to an MME. The transceiver 1200 may transmit information about whether to support NB-IFOM, through the NAS request. The transceiver 1200 may receive a NAS response message from the MME and also information about whether NB-IFOM is applied.

The transceiver 1200 may transmit, to the MME, a PDN connection request containing information about whether to support the NB-IFOM, and may receive, from the MME, a default bearer activation request containing information about whether NB-IFOM is applied, in response to the PDN connection request. The transceiver 1200 may transmit, to the MME, an attach request message or a TAU request message containing information about whether to support the NB-IFOM, and may receive, from the MME, an attach response message or a TAU response message containing information about a determined offloading control function, in response to the attach request message or the TAU request message.

The storage unit 1210 may store information that the UE needs to perform operations according to an embodiment of the present disclosure. The storage unit 1210 may store information that the transceiver 1200 has received or transmitted and may provide the information to the controller 1220.

The controller 1220 may control the states and operations of the components in the UE.

The controller 1220 may control the transceiver 1200 to transmit/receive information to/from a base station or MME.

The controller 1220 may perform offloading operations according to offloading control information provided by core network or offloading control information provided by base station received from the base station. Although the controller 1220 has received the offloading control information provided by base station, the controller 1220 may determine to ignore the information according to information received from the DM server or MME.

More specifically, when the controller 1220 receives offloading control management information from the DM server, the controller 1220 may determine whether to use offloading control information provided by base station or core network, based on the received information. When the controller 1220 receives offloading control management information from the MME, the controller 1220 may determine whether to use offloading control information provided by base station or core network, based on the received information.

Figure 13:
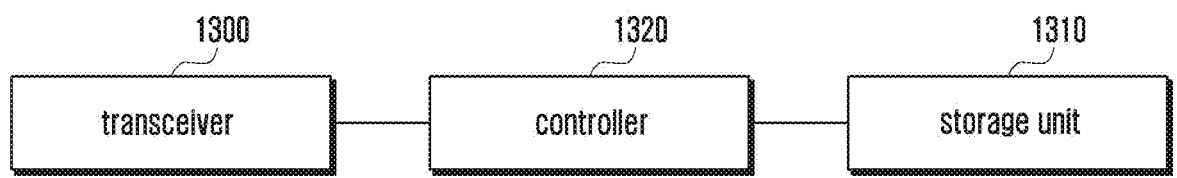
FIG. 13 is a block diagram of a DM server according to an embodiment of the present disclosure.

FIG. 13 is a block diagram of a DM server according to an embodiment of the present disclosure.

Referring to FIG. 13, the DM server may include a transceiver 1300, a storage unit 1310, and a controller 1320.

The transceiver 1300 may perform transmission/reception of information that the DM server needs to perform operations according to an embodiment of the present disclosure. The transceiver 1300 may transmit offloading control management information to UE.

The storage unit 1310 may store information that the DM server needs to perform operations according to an embodiment of the present disclosure.

The controller 1320 may control operations of the components in the DM server. The controller 1320 may control the transmission of offloading control management information from the DM server to the UE. The offloading control management information may include at least one of the following: a condition as to whether the UE uses offloading control information provided by base station, and information about a relative order of priority between offloading control information provided by core network and offloading control information provided by base station.

Figure 14:
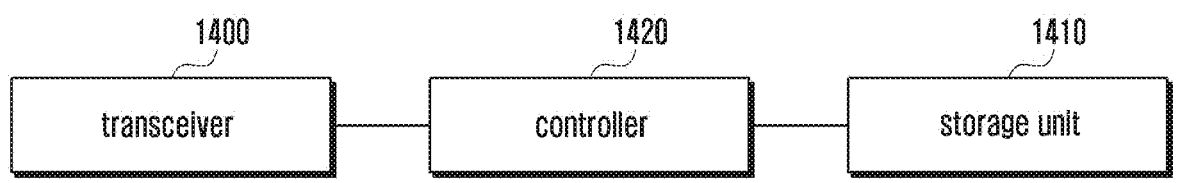
FIG. 14 is a block diagram of a mobility management entity (MME) according to an embodiment of the present disclosure.

FIG. 14 is a block diagram of an MME according to an embodiment of the present disclosure.

Referring to FIG. 14, the MME may include a transceiver 1400, a storage unit 1410 and a controller 1420.

The transceiver 1400 may perform transmission/reception of information that the MME needs to perform operations according to an embodiment of the present disclosure. The transceiver 1400 may receive, from the UE, an NAS request message containing information about whether the UE supports NB-IFOM. The transceiver 1400 may also transmit, to the UE, the NAS response message containing information about whether NB-IFOM is applied.

The transceiver 1400 may receive, from the UE, a PDN connection request message containing a condition as to whether the UE supports NB-IFOM. The transceiver 1400 may transmit, the UE, a default bearer activation request message containing information about whether NB-IFOM is applied or whether WLAN offloading control function is allowed.

The transceiver 1400 may receive, from the UE, an attach request message or a TAU request message containing a condition as to whether the UE supports NB-IFOM. The transceiver 1400 may transmit, to the UE, an attach response message or a TAU response message containing information about a determined offloading control function.

The storage unit 1410 may store information that the MME needs to perform operations according to an embodiment of the present disclosure. The storage unit 1410 may store information received through the transceiver 1400. The storage unit 1410 may also store information that will be transmitted to the UE through the transceiver 1400.

The controller 1420 mays control operations of the components in the MME.

The controller 1420 may determine whether to apply NB-IFOM to the UE, considering a condition as to whether the UE supports NB-IFOM, received from the UE, and the like. The controller 1420 may also generate offloading control management information about which one of the following: offloading control information provided by base station and offloading control information provided by core network the UE, will be used.

According to various embodiments of the present disclosure, since CSI is requested and received between base stations, one base station can perform allocation of resources, considering channel states of the other base station performing cooperative communication. In addition, according to various embodiments of the present disclosure, since resource allocation information is received from other base station performing cooperative communication and feedback is provided about a condition as to whether to comply with the received resource allocation information, the cooperative communication between the base stations can be much smoothly maintained.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a mobile communication system, the method comprising:
   transmitting, to a mobility management entity (MME), a public data network (PDN) connectivity request message including information associated with a network based IP flow mobility (NBIFOM);
   receiving, from the MME, an activate default bearer request message including at least one of a wireless local area network (WLAN) offload indication and information on whether the terminal uses a radio access network (RAN) rule; and
   offloading an internet protocol (IP) flow to a WLAN within a multi-access PDN connection based on the activate default bearer request message.

2. The method of claim 1, wherein the information associated with the NBIFOM includes information on whether the terminal requests the NBIFOM.

3. The method of claim 1, further comprising:
applying the NBIFOM to the multi-access PDN connection, in case that the activate default bearer request message includes an indicator indicating the NBIFOM is accepted.

4. The method of claim 1, further comprising:
identifying whether the activate default bearer request message includes the information on whether the terminal uses the RAN rule; and
performing traffic routing within the multi-access PDN connection based on a NBIFOM routing rule provided by the MME, in case that the activate default bearer request message does not include the information on whether the terminal uses the RAN rule.

5. The method of claim 1, further comprising:
ignoring the WLAN offload, in case that the information on whether the terminal uses the RAN rule is set.

6. The method of claim 1, further comprising:
performing traffic routing within the multi-access PDN connection based on a NBIFOM routing rule provided by the MME, in case that the information on whether the terminal uses the RAN rule is not set.

7. A method by mobility management entity (MME) in a mobile communication system, the method comprising:
receiving, from a terminal, a public data network (PDN) connectivity request message including information associated with a network based IP flow mobility (NBIFOM);
transmitting, to the terminal, an activate default bearer request message including at least one of a wireless local area network (WLAN) offload indication and information on whether the terminal uses a radio access network (RAN) rule; and
offloading an internet protocol (IP) flow to a WLAN within a multi-access PDN connection based on the activate default bearer request message.

8. The method of claim 7, wherein the information associated with the NBIFOM includes information on whether the terminal requests the NBIFOM.

9. The method of claim 7, further comprising:
applying the NBIFOM to the multi-access PDN connection, in case that the activate default bearer request message includes an indicator indicating the NBIFOM is accepted.

10. The method of claim 7, further comprising:
performing traffic routing within the multi-access PDN connection based on a NBIFOM routing rule provided by the MME, in case that the activate default bearer request message does not include the information on whether the terminal uses the RAN rule.

11. The method of claim 7, further comprising:
performing traffic routing within the multi-access PDN connection based on a NBIFOM routing rule provided by the MME, in case that the information on whether the terminal uses the RAN rule is not set.

12. A terminal in a mobile communication system, the terminal comprising:
a transceiver; and
at least one processor coupled with the transceiver and configured to:
control the transceiver to transmit, to a mobility management entity (MME), a public data network (PDN) connectivity request message including information associated with a network based IP flow mobility (NBIFOM),
control the transceiver to receive, from the MME, an activate default bearer request message including at least one of a wireless local area network (WLAN) offload indication and information on whether the terminal uses a radio access network (RAN) rule, and
offload an internet protocol (IP) flow to a WLAN within a multi-access PDN connection based on the activate default bearer request message.

13. The terminal of claim 12, wherein the information associated with the NBIFOM includes information on whether the terminal requests the NBIFOM.

14. The terminal of claim 12, wherein the at least one processor is further configured to apply the NBIFOM to the multi-access PDN connection, in case that the activate default bearer request message includes an indicator indicating the NBIFOM is accepted.

15. The terminal of claim 12, wherein the at least one processor is further configured to:
identify whether the activate default bearer request message includes the information on whether the terminal uses the RAN rule, and
perform traffic routing within the multi-access PDN connection based on a NBIFOM routing rule provided by the MME, in case that the activate default bearer request message does not include the information on whether the terminal uses the RAN rule.

16. The terminal of claim 12, wherein the at least one processor is further configured to ignore the WLAN offload, in case that the information on whether the terminal uses the RAN rule is set.

17. The terminal of claim 12, wherein the at least one processor is further configured to perform traffic routing within the multi-access PDN connection based on a NBIFOM routing rule provided by the MME, in case that the information on whether the terminal uses the RAN rule is not set.

18. A mobility management entity (MME) in a mobile communication system, the MME comprising:
a transceiver; and
at least one processor coupled with the transceiver and configured to:
receive, from a terminal via the transceiver, a public data network (PDN) connectivity request message including information associated with a network based IP flow mobility (NBIFOM),
control the transceiver to transmit, to the terminal, an activate default bearer request message including at least one of a wireless local area network (WLAN) offload indication and information on whether the terminal uses a radio access network (RAN) rule, and
offload an internet protocol (IP) flow to a WLAN within a multi-access PDN connection based on the activate default bearer request message.

19. The MME of claim 18, wherein the information associated with the NBIFOM includes information on whether the terminal requests the NBIFOM.

20. The MME of claim 18, wherein the at least one processor is further configured to apply the NBIFOM to the multi-access PDN connection, in case that the activate default bearer request message includes an indicator indicating the NBIFOM is accepted.

21. The MME of claim 18, wherein the at least one processor is further configured to perform traffic routing within the multi-access PDN connection based on a NBIFOM routing rule provided by the MME, in case that the activate default bearer request message does not include the information on whether the terminal uses the RAN rule.

22. The MME of claim 18, wherein the at least one processor is further configured to perform traffic routing within the multi-access PDN connection based on a NBI-FOM routing rule provided by the MME, in case that the information on whether the terminal uses the RAN rule is not set.

* * * * *